April 13, 1971 E. E. SEGERSON 3,574,815

METHOD OF FABRICATING A PLASTIC ENCAPSULATED SEMICONDUCTOR ASSEMBLY

Original Filed Dec. 26, 1967

INVENTOR.
Eugene E. Segerson
BY
Mueller, Aichele & Rauner
Att'ys

United States Patent Office 3,574,815

Patented Apr. 13, 1971

3,574,815

METHOD OF FABRICATING A PLASTIC ENCAPSULATED SEMICONDUCTOR ASSEMBLY

Eugene E. Segerson, Tempe, Ariz., assignor to Motorola, Inc., Franklin Park, Ill.

Continuation of application Ser. No. 693,605, Dec. 26, 1967, which is a continuation-in-part of application Ser. No. 564,818, July 13, 1966. This application Mar. 23, 1970, Ser. No. 20,458

Int. Cl. B29d 3/00

U.S. Cl. 264—269 4 Claims

ABSTRACT OF THE DISCLOSURE

A method of plastic encapsulation including the use of a core pin in a pressure-type mold which forces a nonplastic plate-like member against a die face for preventing plastic encapsulating material from flowing between the die face and the nonplastic plate-like member to form an exposed nonplastic surface on a plastic encapsulated assembly.

RELATED APPLICATION

This application is a continuation of application Ser. No. 693,605, filed Dec. 26, 1967, now abandoned, which is a continuation-in-part of application Ser. No. 564,818, filed July 13, 1966, now abandoned.

BACKGROUND OF THE INVENTION

This invention relates to a method of fabricating a plastic encapsulated device with a relatively large nonplastic outer surface, which surface may be used as a thermal path.

Semiconductor power devices, such as power transistors and thyristors, have substantial amounts of internally generated heat which must be dissipated during the device operation. Because the active element, commonly called a die, of a semiconductor device is very small, the removal from the die of heat generated during the operation of the device has consistently been an important consideration in the overall device construction. Previously, a metal encapsulating medium having high heat-conducting capabilities was generally utilized for power devices because it could effectively dissipate this heat.

With plastic encapsulation, the dissipation of heat through the plastic packaging medium is substantially reduced because of the relatively poor heat transferring properties of plastic. To remove this heat, metal tabs that protrude from one end of the plastic package have been provided in the prior devices for coupling to a larger heat sink. Generally, a large metal tab is utilized because the flow of heat from the die of the device is indirect and through a substantial length of reduced cross section having relatively poor heat transferring properties before reaching the heat sink. Accordingly, the size of the package is substantially increased to compensate for this metal tab.

Plastic encapsulated semiconductor assemblies having a good thermal heat-dissipating path within the general outlines of the overall package have not yet been provided. Such a path usually requires a relatively large nonplastic outer surface. Such a package would facilitate mounting of the assembly as well as reduce costs if a facile method of fabrication could be utilized.

SUMMARY OF THE INVENTION

An object of the present invention is to provide a facile method of plastic encapsulating an assembly leaving an exposed outer nonplastic surface which eliminates stripping plastic material from such nonplastic surface.

Another object of this invention is to provide a plastic encapsulated semiconductor power device wherein satisfactory heat dissipation during operation of the device is achieved through a metal heat dissipating surface which is an integral part of a metal element of the complete device, and yet lies wholly within the outlines, or outside dimensions, of the plastic encapsulation, and thus has no external portions extending outside the outlines of the plastic housing.

A further object of this invention is to provide a device wherein the forming and handling of the metal portion is automated, and the plastic encapsulation is performed with maximum automation, and yet the molding can be accomplished to provide an exposed metal surface flush with the outline of the molded plastic but within the outline of a molding cavity so as to make a simple molding operation possible.

A feature of this invention is the provision of holding a nonplastic surface against a die part face during molding operation such that fluid plastic encapsulating material does not flow between such nonplastic surface and die part face.

Another feature of the present invention is the provision of an aperture forming core pin on one die face engaging a metal heat conductive member and forcing it against the opposing die face during a molding operation such that no fluid encapsulating plastic material flows between the heat sink portion and the opposing die face.

THE DRAWINGS

DESCRIPTION OF THE ILLUSTRATIVE EMBODIMENT

Figures 1, 2, 3:
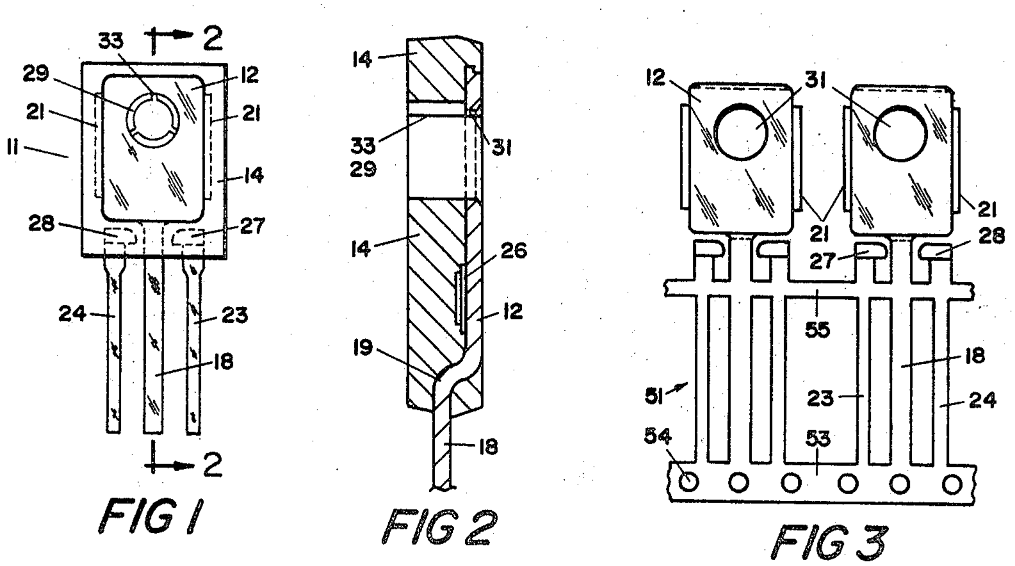
FIG. 1 is an enlarged plan view of the bottom face of a transistor device.
FIG. 2 is a view in section along line 2—2 of the device shown in FIG. 1, but enlarged and giving greater detail of the internal structure of the device.
FIG. 3 is a plan view of a continuous integral metallic strip in the form utilized in the automated assembly of semiconductor devices, and showing a plurality of joined metallic groups that are cut apart after encapsulation to form the individual devices shown in full and dotted lines in FIG. 1.

One embodiment of the invention was used to fabricate a semiconductor device primarily for use as a power unit requiring substantial dissipation of internally generated heat. The device is comprised of three adjacent but physically separated metallic members lying in substantially a single plane with at least one of the members terminating at one end in a mounting portion displaced from this original plane and substantially larger than the balance of the members. The mounting portion has a first and a second surface and includes an opening extending therethrough. The other members terminate in the original plane adjacent to but spaced longitudinally away from the mounting portion. All metallic members extend parallel to one another longitudinally away from the mounting portion to form leads for joining the device to an electrical circuit. A semiconductor die is positioned on the mounting portion at the first surface and is connected electrically to the metallic members by wires. A plastic encapsulation is disposed about the die, connecting wires, and the immediately adjacent parts of the metallic members. The encapsulation is formed so that substantially the entire second surface of the mounting portion is exposed. An opening in the plastic connects with the opening in the mounting portion for receiving a bolt or other fastening to mount the device on a metal surface in electrical equipment.

In fabricating the above-described device in a pressure-type plastic encapsulating mold machine, such as a transfer mold, an aperture-forming core pin was mounted on one die part and extended toward an opposing die part. The mounting portion was placed on the opposing die part face with its aperture coaxially disposed with respect to the smaller diameter core pin. The core pin had a core pin cap with three radially-outwardly extending flanges to engage the mounting portion symmetrically about the aperture whenever the two die parts were closed to form a cavity. The arrangement was such that during the subsequent molding operation the flange engagement forced the mounting portion against the opposing die part face such that no plastic encapsulating material flowed therebetween. In this manner, a large nonplastic outer surface disposed within the confines of the device outline was provided without requiring stripping plastic encapsulating material from the nonplastic surface.

A semiconductor device 11 (FIG. 1) has, on a face thereof that would conventionally be mounted adjacent to a metal chassis, an exposed surface of a large metal mounting portion 12. This surface is surrounded by plastic 14 which forms the encapsulation for the device. A semiconductor die (not visible in this view) is mounted directly on mounting portion 12 so that there is good heat transfer between the two, although the die may be electrically insulated therefrom. When assembled in electrical equipment, this exposed surface is generally coupled with a large heat sink to provide for the rapid and efficient removal of heat generated internally during the operation of the device.

Mounting portion 12 is integral with a lead 18 extending outwardly from the device in one direction, and is in a plane different than lead 18 so that this lead may be electrically insulated from the larger heat sink to which the device is attached, as shown in FIG. 2. These two portions are connected by an offset bend 19 formed in the metallic member.

To aid in the retention of mounting portion 12 in plastic 14, a flange 21 of mounting portion 12 extended upwardly in such a manner that the plastic grips it firmly when the plastic cures in the molding operation. In device 11, two parallel flanges 21 on opposite sides of the exposed surface are utilized for this purpose, and each extends inwardly into the plastic material.

Two other leads 23 and 24 extend outwardly from plastic 14 substantially parallel to lead 18. Leads 23 and 24 terminate in wire bonding pads 27, 28, which are sections that have been enlarged to facilitate the bonding thereto of the fine wires utilized in assembling device 11. Pads 27, 28 are in close proximity to mounting portion 12 and in the same plane as leads 23, 24. These enlarged areas are enclosed in the plastic encapsulation of the final device.

Although device 11 has three leads, the invention is not to be construed as being limited to this number as it is evident that the number of leads may be readily increased. All of these leads are fabricated from a metal having very low electrical resistance and very high thermal conductivity, and preferably comprise a base metal of copper plated with nickel for corrosion resistance and facilitating the assembling operation.

Plastic 14 is preferably a low shrink-filled epoxy material suitable for transfer molding. In choosing a plastic, its compatibility with the components of the device and the stability of the device encapsulated therein when aged and subjected to wide variations in environmental conditions are two considerations of prime importance.

A plastic suitable for transfer molding is preferred because the resulting encapsulation is uniform, void-free, and tightly sealed about the elements of the device. Epoxies and silicones, with or without fillers, are preferred, although many other well known plastics with similar properties may be utilized.

In transfer molding the plastic encapsulation for the present device, heat and pressure are applied to convert the plastic, which is normally in a solid state, into a very low viscosity liquid which is then rapidly transferred from one mold chamber into another normally comprising the final package shape. Because of this low viscosity and the nature of the transfer molding, high pressures may be utilized without damaging the delicate parts associated with semiconductor devices. With the uniform mass formed by transfer molding the plastic encapsulation, the elements of device 11 are held in a rigid fixed relationship and generally are not subject to damage by vibrations and shocks.

The bottom surface of mounting portion 12 (FIG. 2) is flush with the bottom surface of plastic 14 so that when mounted on a chassis or other structure intimate contact is maintained therebetween. This provides a large heat transferring surface for dissipating heat vertically and laterally from a die 26 mounted on mounting portion 12. The resulting effect is as if the die were mounted directly on the larger heat sink giving nearly ideal heat transferring properties.

Die 26 is a chip of silicon having two major faces, wherein one face comprises the collector of a transistor, and the other face comprises the emitter and base. Although die 26 is fabricated from silicon, it can also be fabricated from other semiconductor materials.

The amount of heat that may be dissipated by a unit is effectively the amount that may be transferred across the boundary of this one major face. The mounting of die 26 in this manner on mounting portion 12 results in the direct flow of heat from one face of die 26, the collector in this transistor, through the mounting portion to, as is usually the situation, a larger heat sink. This short, direct path for the heat transfer takes full advantage of the maximum heat transferring area of the die.

Device 11 is conveniently mounted by inserting a bolt or other fastener through opening 29 in plastic 14 that connects with an opening 31 in mounting portion 12. The diameter of opening 29 is less than the diameter of opening 31 to electrically insulate the fastener from mounting portion 12. It should be noted that plastic 14 extends through and covers the exposed metal in opening 31 to provide complete insulation. The bottom edge of opening 31 is beveled to facilitate the grasping and holding of the plastic thereon. The metal of mounting portion 12 is partially exposed in the three slots 33 (FIG. 1), but because of the greater diameter of opening 31, the insulating effect of plastic 14 is preserved.

The fabrication of semiconductor device 11 according to the invention is facilitated by the use of a metal strip 51 (FIG. 3) that has been punched to form a plurality of interconnected groups of individual metallic members included in the final device. Each group includes mounting portion 12, wire bonding areas 27, 28, and external leads 18, 23, 24. The groups are joined by a heavy connecting band 53 with a plurality of openings 54 therein that are utilized to position the groups during the assembling steps as the strip is moved through assembly machinery. To retain the individual members of device 11 in a set relationship during the assembling steps, a tie strip 55 is provided immediately below the portion of device 11 ultimately covered by plastic 14. Metal srtip 51 is conveniently punched or formed by other commonly used metal forming techniques at a relatively low cost when compared to the cost of piece parts serving a similar function in previous device structures.

With the use of strip 51, the fabrication of device 11 is highly mechanized and the cost thereof reduced. The assembly machinery utilized has an indexing means that functions in conjunction with openings 54 to consistently and precisely position the groups of metallic members for each step of the fabrication.

A strip 51 is inserted in a die bonder (not shown) and the first group aligned with mounting portion 12 under the die bonding needle. Once an initial alignment is made, the balance of the mounting portion 12 is automatically aligned under the needle in a progressive operation. Die 26 (FIG. 4) is bonded in a preselected location on each mounting portion 12 toward the edge thereof near tie strip 55 and on the center line of the appendage. Die 26 is adjacent to offset bend 19 connecting mounting portion 12 with integral lead portion 18. Many techniques of die bonding are known and will not be described herein.

Strip 51 with dice 26 bonded thereto, corresponding in number to the groups of metallic members in the strip, is transported as a unit to a wire bonding machine (not shown). An alignment is made on the first group and a fine wire 34 is bonded to die 26 and wire bonding area 28. The wire bonding is progressively repeated for each group on strip 51. At the completion of one pass of the strip through the wire bonder, the first group is again positioned under the wire bonder and the operation repeated to bond a wire 35 to wire bonding area 27. Fine wires 34, 35 electrically couple the emitter and base electrodes of the transistor to their corresponding external leads. The ease and rapidity with which die 26 is mounted and fine wires 34, 35 are connected, clearly evidence the efficient and inexpensive nature of this type of assembly.

Strip 51, now including the partially assembled transistor devices, is removed from the wire bonder and transported to a transfer mold (not shown) for plastic molding. The number of groups formed in a strip is usually selected so that the entire strip may be positioned in the transfer mold as a single unit and the mold closed thereabout to form individual mold cavities about each group of metallic members. Included in the cavity are mounting portion 12, die 26, fine wires 34, 35, wire bonding areas 27, 28, and adjacent portions of leads 18, 23, 24.

Figures 4, 5, 6, 7, 8:
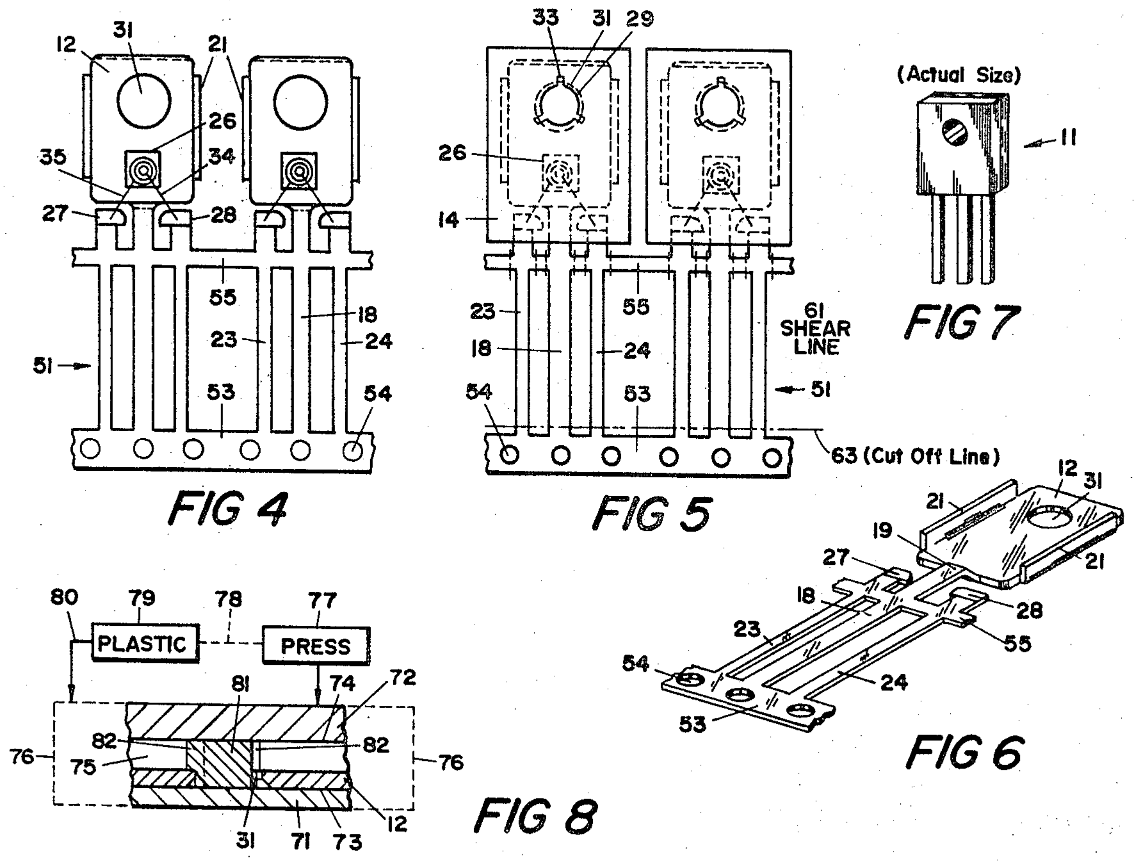
FIG. 4 is the metallic strip shown in FIG. 3 with semiconductor dice affixed to mounting portions, joined by fine wires to integral lead portions of the strip.
FIG. 5 is a transparent view of the metallic strip of FIG. 4 after a plastic encapsulation has been disposed about the die, fine wires, and adjacent metallic portions of each device group, and is ready to be sheared to produce the device of FIG. 1.
FIG. 6 is an enlarged perspective view of a group of joined metallic portions that is part of the continuous metallic strip shown in FIG. 3.
FIG. 7 is a perspective view in actual size of one commercial embodiment of a device produced by this invention.
FIG. 8 is a diagrammatic showing of a core pin engaging a mounting portion or heat sink member during the encapsulation of the illustrated embodiment.
Figure 9:
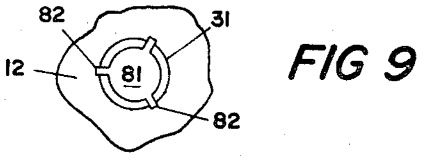
FIG. 9 is a simplified diagrammatic plan view showing the relationship of a core pin used to hold the mounting portion against the die face and its relationship to the aperture in the mounting portion.

Plastic encapsulating mold machines are well known; therefore, a detailed discussion thereof is disposed with; rather, the diagrammatic showings in FIGS. 8 and 9 are used to illustrate the process of fabrication within any type of plastic encapsulating machine. Such a machine may have stationary die part 71 facing movable die part 72 having opposing faces 73 and 74, respectively. When the die parts are closed, mold cavity 75 is formed therebetween. Dashed lines 76 indicate that die parts 71 and 72 close to form a fluid containing cavity 75. Press 77 forces die part 72 against die part 71 to form the seal. Washed line 78 indicates plastic source 79 is coordinated with press 77 closing the die parts to supply fluid plastic encapsulating material under pressure into cavity 75 through a fluid communicative passageway indicated by arrow 80.

To plastic encapsulate the illustrated assembly, mounting portion 12 is disposed on face 73 of die part 71. The semiconductor die and flanges 21 (not shown in FIG. 8) face the opposing die face 74. The opposing die face 74 has a core pin 81 extending toward die face 73 for forming aperture 29 in the plastic encapsulation. Such core pins are well known in the plastic encapsulating art. Such core pin may be a moveable ejector type pin or a non-moveable core pin on moveable die part 72. On the outward end of the core pin, a core pin cap with three radially-outwardly extending flanges 82 is provided. In FIG. 8 such is shown as an integral part of core pin 8. This cap is a part of the core pin that wears and it is made removable to reduce maintenance cost of the mold. The three radial flanges 82 form the three grooves 33 in the plastic encapsulation. During molding, flanges 82 engage mounting portion 12 symmetrically about the periphery of aperture 31 (see FIG. 9) to force mounting portion 12 securely against die face 73 (FIG. 8). The pressure exerted on mounting portion 12 by the core pin 81 is preferably greater than the pressure of the fluid plastic encapsulating material being forced into mold cavity 75. In this manner no plastic encapsulating material flows between mounting portion 12 and the supporting die face 73. Referring to FIG. 5 of the drawing, it is seen that the grooves 33 expose a small portion of one surface of mounting portion 12. Such exposed portions constitute about one-half the depth of the respective grooves, which means a mounting bolt is still insulated for mounting portion 12. Therefore, in fabricating the device such as illustrated in the attached drawing, the fabrication is facilitated to have both sides of mounting portion 12 exposed at least to some degree for permitting high pressures to be exerted on the mounting portion during plastic encapsulation. It is to be understood that mounting portion 12 may have upstanding members thereon for receiving the core pin cap so long as the compressive strength of such upstanding members is greater than the molding pressure of the fluid plastic encapsulating material. In fact, the exposed portion of member 12 in grooves 33 may be flush with one surface of plastic encapsulating material 14.

Another method of fabrication includes stripping plastic encapsulation material from portion 12 after the encapsulated device is removed from the mold. Such latter method is well known.

With the mold closed, a fluid epoxy material is transferred into the cavities to form individually encapsulated devices. The thermosetting epoxy material cures rapidly, and a dense, solid plastic encapsulation, securely and tightly sealed about the protruding metallic members, is formed (FIG. 5). A strip of interconnected completed devices 11, having formed therein opening 29 connecting with opening 31, is removed from the mold. The plastic material does not cover the bottom surface of mounting portion 12 so that upon removal from the mold this surface is exposed and flush with the surrounding face of plastic 14.

Strip 51 is transported to a metal shear where it is separated along shear line 61 and cut off line 63 to complete the fabrication of individual transistor device 11. These devices are catagorized according to their electrical characteristics to complete the fabrication steps.

The relative position of flange 21 to mounting portion 12 is shown in the perspective view, FIG. 6. Flange 21 is integral with mounting portion 12 and extends upwardly into the plastic encapsulation to aid in retaining the mounting portion therein and the formation of a satisfactory seal thereabout. Also, in FIG. 6 the relative planes of the mounting portion 12 and leads 18, 23, 24 are readily observed. Mounting portion 12 is joined to lead 18 by offset bend 19 that is advantageously formed during the stamping of the metallic strip.

In FIG. 7, an actual size representation of a 50-watt transistor having a structure according to the invention is shown. The face dimensions of the plastic encapsulation are about ½ by ⅝ inch and the depth about ⅛ inch. With a prior metal tab structure, a package this size could only accommodate a 15-watt unit. Because of the improved heat transferring properties of the novel device of this invention, a 15-watt unit is readily accommodated in a package similar in appearance to the 50-watt unit having face dimensions of about 1/4 by 3/8 inch and a 1/16 inch depth, representing a substantial reduction in size.

With the improved heat transfer capabilities of the device according to the invention, packages smaller than those described above are feasible. Factors such as the temperature of the heat sink and the commercially acceptable package size influence the selection of the final dimensions. It is understood that the physical package configuration and the number of leads utilized may be readily altered within the scope of the invention.

The above description and drawings show that the present invention provides a novel semiconductor device encapsulated in a plastic material especially suited for use as a power device. The overall size of the device is reduced substantially in comparison to prior devices, while at the same time the power handling capabilities are increased. Additionally, with this novel semiconductor device the transfer of heat from the semiconductor die is accomplished in a more direct and efficient manner.

I claim:

1. In the fabrication of a semiconductor device having plastic encapsulation for the semiconductor unit thereof and which device includes metal means with an apertured flat metal portion that is exposed at one face of the plastic encapsulation and serves at said exposed one face as an external surface heat sink for dissipating heat from said device and serves at the opposite face thereof as a mounting for the semiconductor unit of said device, which said device also has conductor means connected to said unit within said plastic encapsulation, the steps of providing mold equipment which includes a first mold part with a mold cavity portion therein, includes a second mold part, and includes a core pin associated with said mold equipment with the latter having a minor diameter portion and a major diameter portion, placing said metal means in the mold equipment with one face of the flat metal portion against a surface of the mold cavity portion in the first mold part, closing said mold equipment by bringing said mold parts together to provide a closed cavity at said mold cavity portion to enclose said flat metal portion and semiconductor unit and conductor means at the connection to said unit, and coincident with the closing of said first and second mold parts moving said core pin into alignment with and through the aperture in the flat metal portion with at least a portion of the major diameter portion of the core pin in engagement with said opposite face of the metal portion and at least a portion of the minor diameter portion in spaced relationship from the periphery of said aperture, applying pressure through said core pin to said flat metal portion to maintain said one face of said metal portion in tight flush engagement with the mold cavity surface during the plastic encapsulating, introducing plastic into the mold cavity to flow therein under pressure with said core pin confining the flowing plastic so as to provide a hole in the plastic encapsulation of the semiconductor device on said opposite face, said hole having a diameter corresponding to the minor diameter of the core pin which said minor diameter is less than the diameter of the metal portion aperture, said plastic flowing over the surface of the minor diameter portion of said core pin and into said aperture, maintaining pressure on said flat metal portion through said core pin during the flowing of plastic which is greater than the pressure of the flowing plastic to maintain said one face flush against said surface of the mold cavity while encapsulating the remainder of said metal portion around said flush face and encapsulating the semiconductor unit and conductor means at the connection thereto on said opposite face, opening the mold and removing the plastic encapsulated structure therefrom, and completing said semiconductor device with said one face of the apertured metal portion free of plastic encapsulation and with said opposite face and the sides of the metal portion within said plastic encapsulation.

2. In a method as defined in claim 1 for a semiconductor device wherein the flat metal portion has a relief portion around the aperture at said one face of the metal portion, and wherein the core pin at the aperture is spaced from the aperture wall and permits plastic to flow in the mold cavity through said aperture to said relief portion, and wherein the plastic when cured is maintained at said relief portion in the semiconductor device.

3. In the fabrication of a semiconductor device having plastic encapsulation for the semiconductor unit thereof and which device includes metal means with an apertured flat metal portion that is exposed at one face of the plastic encapsulation and serves at said exposed one face as an external surface heat sink for dissipating heat from said device and serves at the opposite face thereof as a mounting for the semiconductor unit of said device, which said device also has conductor means connected to said unit within said plastic encapsulation, the steps of providing mold equipment which includes a first mold part with a mold cavity portion therein, includes a second mold part, and includes a core pin associated with said mold equipment with the latter having a minor diameter portion and a major diameter portion, placing said metal means in the mold equipment with one face of the flat metal portion against a surface of the mold cavity portion in the first mold part, closing said mold equipment by bringing said mold parts together to provide a closed cavity at said mold cavity portion to enclose said flat metal portion and semiconductor unit and conductor means at the connection to said unit, and coincident with the closing of said first and second mold parts moving said core pin into alignment with and through the aperture in the flat metal portion with at least a portion of the major diameter portion of the core pin in engagement with said opposite face of the metal portion and at least a portion of the minor diameter portion in spaced relationship from the periphery of said aperture, applying pressure through said core pin at said major diameter portion to said flat metal portion to maintain said one face of said metal portion in tight flush engagement with the mold cavity surface during the plastic encapsulating and with said core pin at the minor diameter portion positioned in said aperture, introducing plastic into the mold cavity to flow therein under pressure, said core pin confining the flowing plastic at its minor diameter portion so as to provide a hole in the plastic encapsulation of the semiconductor device when it is cured on said opposite face of said metal portion corresponding in diameter to the minor diameter of the core pin, with said minor diameter being less than the diameter of the metal portion aperture, flowing plastic over the surface of said core pin at its minor diameter portion in the aperture to define a hole in the plastic in the aperture, maintaining pressure on said flat metal portion through said core pin during the flowing of plastic which is greater than the pressure of the flowing plastic to maintain said one face flush against said surface of the mold cavity and prevent plastic from flowing over said one face while encapsulating the remainder of said metal portion around said flush face and encapsulating the semiconductor unit and conductor means at the connection thereto on said opposite face, opening the mold and separating the mold parts and removing the core pin removing the plastic encapsulated structure from the mold, and completing said semiconductor device so that said one face of the apertured metal portion is free of plastic encapsulation and said opposite face and the sides of the metal portion are within said plastic encapsulation.

4. In the method of claim 3 wherein the core pin at the major diameter portion has spaced protrusions on the surface thereof, maintaining the pressure on the flat metal portion through said protrusions engaging the same around the aperture, flowing plastic into the aperture through the spaces between the protrusions around the core pin.

References Cited

UNITED STATES PATENTS

| | | | |
|---|---|---|---|
| 2,028,592 | 1/1936 | Crowley | 264—276X |
| 2,669,753 | 2/1954 | Hormann | 264—276 |
| 3,081,497 | 3/1963 | Scherry | 264—276 |
| 3,391,426 | 7/1968 | Hugill | 264—274X |
| 3,413,713 | 12/1968 | Helda | 264—272(UX) |
| 3,463,845 | 8/1969 | De Pass | 18—36X |

ROBERT F. WHITE, Primary Examiner

A. M. SOKAL, Assistant Examiner

U.S. Cl. X.R.

264—272, 274, 276; 18—36; 29—588